Feb. 24, 1970   F. TUCZEK   3,497,199
HYDROPNEUMATIC, SELF-PUMPING, TELESCOPIC SHOCK
ABSORBER, PARTICULARLY FOR MOTOR VEHICLES
Filed June 12, 1967   6 Sheets-Sheet 1

INVENTOR

FRANZ TUCZEK

BY McGlew and Toren
ATTORNEYS

Feb. 24, 1970       F. TUCZEK       3,497,199
HYDROPNEUMATIC, SELF-PUMPING, TELESCOPIC SHOCK
ABSORBER, PARTICULARLY FOR MOTOR VEHICLES
Filed June 12, 1967       6 Sheets-Sheet 5

Fig.9

INVENTOR
Franz TUCZEK

INVENTOR

FRANZ TUCZEK

BY: McSteward Tren

ATTORNEYS 3,497,199
HYDROPNEUMATIC, SELF-PUMPING, TELESCOPIC SHOCK ABSORBER, PARTICULARLY FOR MOTOR VEHICLES
Franz Tuczek, Eitorf, Germany, assignor to Boge GmbH, Eitorf, Germany
Filed June 12, 1967, Ser. No. 645,136
Claims priority, application Germany, June 10, 1966,
B 87,494; May 26, 1967, B 92,713
Int. Cl. B60g *11/26*
U.S. Cl. 267—64　　　　　　　　　　　　　　16 Claims

ABSTRACT OF THE DISCLOSURE

A hydropneumatic, self-pumping telescopic shock absorber, particularly for motor vehicles, has level regulation, one or more oil-filled working zones loaded by the pressure of gas cushions, a pump cylinder, a working piston associated with the pump cylinder and a tubular pump rod movable relative to the pump cylinder. The rod pumps oil from a zone at low pressure into the pump cylinder and delivers oil into a zone at higher pressure, and the pump rod and the pump cylinder have control edges cooperable with control apertures, in dependence on the stroke of the pump rod relative to the pump cylinder, to control connection of the working zones to each other and to the pump cylinder.

The improvement of this type of shock absorber is a control sleeve closely embracing the pump rod and mechanically connected, either rigidly or flexibly, to the pump cylinder. The control sleeve has a free end extending from the pump cylinder and its opposite end extends into a cavity in the pump cylinder, this sleeve providing a control edge fixed relative to the pump cylinder for cooperation with the control apertures in the tubular pump rod. Ancillary features include valve means associated with the control sleeve and with the working piston, and various novel arrangements of the working zones and of the gas cushion means.

BACKGROUND OF THE INVENTION

In known shock absorbers of the type to which the invention is directed, the control edges are formed by the shell or cylindrical wall of the pump cylinder and which is rigidly connected with the working piston. The guidance of the working piston in the working cylinder for relative reciprocation, on the one hand, and the guidance of the tubular working piston rod, acting at a pump cylinder in relation to a pump rod, for relative reciprocation, on the other hand, must be matched exactly or else malfunctions due to canting and jamming will occur. A disadvantage is that the exact centered position of the individual parts in relation to each other, and the precision of their rotation-symmetrical machining, must meet high requirements. The tolerances allowable during machining must be particularly small, for the reason that the lengthwise guidings of the working piston and the pump rod are quite long in proportion to their diameters.

SUMMARY OF THE INVENTION

The invention relates to hydropneumatic, self-pumping telescopic shock absorbers and, more particularly, to shock absorbers of this type in which proper sealing of parts sliding on one another is obtained without functional disturbances due to frictional or jamming resistances, and which can be produced without excessive expenditures for precision-fit centric machining of the relatively sliding parts.

In accordance with the invention, a control sleeve is provided in closely embracing relation with the pump rod and is flexibly and tightly connected with the pump cylinder. This control sleeve has one end extending from the pump cylinder and its other end opening into a cavity of the pump cylinder. By virtue of its mounting, the control sleeve can yield laterally and angularly while still embracing the pump rod very cosely, so that oil losses in the clearance between the pump rod and the pump cylinder are substantially completely avoided. In a particularly advantageous arrangement of the control sleeve, the latter is provided with an outer collar forming a check valve with a valve seat of the pump cylinder. Thereby, the control sleeve can take over the function of an inlet or outlet valve of the pump, eliminating the necessity for a separate valve.

Preferably, the pump cylinder is part of the hollow or tubular working piston. With this arrangement, the control sleeve extending freely into the working piston results in a very simple design of shock absorber, where the oil-filled working cylinder is subdivided by the piston into two working zones interconnected, in the piston, by passages in the piston. Compensation zones are provided, in which the zone containing the elastic gas cushion communicates with a working zone, and the other zone serves as a storage tank when the compensation zone containing the elastic gas cushion communicates with the working zone of the piston rod at the outlet side. In known self-pumping shock absorbers of the type to which the invention relates, the compensation zone containing the gas cushion is connected with the working zone away from the piston rod outlet side. The provision of a control sleeve extending freely into the hollow working piston is particularly advantageous also when not only the pump rod but also the displacement of the annular surface formed by the working piston and the piston rod, is used as a pump.

The advantage of the control sleeve in accordance with the invention and serving as a control organ for the pumping action is that a sliding tight fit is necessary only between the inner surface of the sleeve and the outer surface of the pump rod. However, the machining expense for even this tight fit contributes considerably to the manufacturing cost of the shock absorber, especially as the length of the control sleeve is a multiple of its diameter in order that the control sleeve will have an extent such that its lower edge will extend to the control aperture of the pump rod at mid-strike of the shock absorber, and thus insure adjustment to the desired spring level. In a control sleeve of this length, the sliding tight fit leads to an appreciable friction with relation to the pump rod and, if an outer collar of the control sleeve also serves, in cooperation with a valve seat at the pump cylinder, as a check valve, the valve movement is hindered by this friction of the long control sleeve on the pump rod.

In accordance with the invention, an even simpler manufacturing procedure resul ing in a sliding tight fit with low sliding friction of the control sleeve on the pump rod is obtained by designing the control sleeve as a valve sleeve operating as a check valve and providing one or more partial sleeves fixed axially within the pump cylinder. Advantageously, the short valve sleeve and the partial sleeves can be machined with little expenditure to provide the required fit, it being possible to select, for the valve sleeve profiled in its radial section, and for the partial sleeves advantageously designed as pipe sections, the machining most favorable in the particular case. For example, the partial sleeves can be formed from calibrated pipes and thus quite possibly require only honing. It is also advantageous, with respect to quantity production of shock absorbers of different strokes and where the control sleeves must have different lengths, if identical partial sleeves can be used with the extra length being provided by an additional partial sleeve.

A slight axial spacing may be provided between the valve sleeves and the partial sleeves, or between the partial sleeves themselves, as long as the covering of the control aperture of the pump rod, interrupted in these axial gaps, does not interfere with the regulating function of the shock absorber. In accordance with another feature of the invention, the valve seat of the pump cylinder, which cooperates with the valve sleeve to form a check valve, is designed as an overload valve of a known type. As soon as a pressure corresponding to the permissible static load is exceeded in the high pressure zone of the shock absorber, the pump cylinder is filled, during the suction stroke of the pump, not only through the suction valve but also, or exclusively, through the opened overload valve.

The friction of the control sleeve, however, since the sleeve is relatively thin-walled and elastic, is increased by the pressure in the working cylinder when the overflow aperture is covered by the control sleeve. This also hinders the closing movement of the control sleeve and this may lead to malfunctions of the level regulation.

In accordance with the invention, a further reduction of friction, without additional cost for precision fit machining, is achieved by forming the flange of the control sleeve with valve-fitted openings connecting the working cylinder with the pump cylinder. Preferably, the openings are covered by valve disks and designed as outlet valves having a weak spring loading or bias. Thus, the friction between the pump rod and the sleeve can advantageously not influence the movements of the outlet valve, whose weak spring loading requires only small opening forces. At the same time, there is the advantage that in the necessarily restricted region between the pump rod and the piston, little space is required for the accommodation of an outlet valve not hindered by friction.

Preferably, a spherical flange of the control sleeve is pressed in an articulated manner against an end face of the piston by a strong spring, with the interposition of an additional ring which is spherical on one side and plane on the other. If, for reasons of noise, the stroke of the valve disk is limited to a small amount by corresponding abutments and if, at high piston speeds, undesirably high flow resistances of the outlet valve occur, the control spring advantageously can open even against the force of the strong spring and thus clear additional flow cross sections. It is possible also to design the openings covered by the valves as suction valves or as an overload valve limiting the carrying capacity of the spring element.

An object of the invention is to provide an improved hydropneumatic, self-pumping telescopic shock absorber particularly for vehicles.

Another object of the invention is to provide such an improved telescopic shock absorber including a control sleeve fixed against movement relative to the pump cylinder and closely embracing the pump rod, this control sleeve having an end thereof acting as a control edge cooperable with control apertures in the pump rod.

A further object of the invention is to provide a hydropneumatic shock absorber of the type mentioned in which the control sleeve can be designed as, or provided with, control valve elements.

Still another object of the invention is to provide a hydropneumatic shock absorber of the type mentioned in which tight fit of parts sliding on each other is attained without excessive machining costs.

A further object of the invention is to provide a hydropneumatic shock absorber of the type mentioned in which the control sleeve may be designed as a plurality of relatively short sleeves, which may be spaced slightly axially from each other and each of which is fixed against movement relative to the pump cylinder.

BRIEF DESCRIPTION OF THE DRAWINGS

For an understanding of the principles of the invention, reference is made to the following description of typical embodiments thereof as illustrated in the accompanying drawings.

In the drawings.

DESCRIPTION OF THE PREFERRED EMBODIMENTS

Figure 1:
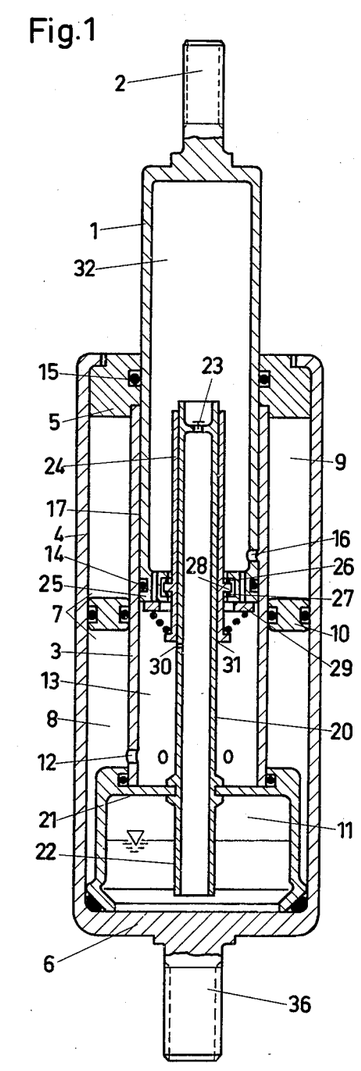
FIG. 1 is a longitudinal sectional view of a shock absorber embodying the invention and including a continuous working piston and a control sleeve which, in the retracted position of the piston, covers a control aperture of a pump rod.

Referring first to FIG. 1, the embodiment of the shock absorber shown therein comprises a working piston 1 having an anchoring means, such as a pin 2, on its outer end, and a working cylinder 3 within a housing 4 having a cover 5 and a closed end 6. Bottom end 6 is provided with an anchoring means such as a pin 36. Housing 4 encloses an annular compensation zone 7 which communicates, through throttling bores 12, with the working zone 13 of working cylinder 3. Annular compensation zone 7 comprises oil zone 8 and gas zone 9, which are separated from each other by separating piston 10. Housing 4 additionally contains a storage tank 11 filled partly with oil and partly with gas, and this tank is sealed off from working zone 13 and annular zone 7. A hollow or tubular pump rod 20 is secured in the transverse wall 21 of tank 11, and has an end 22 extending into the oil zone of storage tank 11. At its other end, pump rod 20 carries a suction valve 23.

Pump rod 20 is closely embraced by a control sleeve 24 and, by means of elastic rings 26 and 27 engaging a collar 28 of control sleeve 24, the latter is secured flexibly and tightly in the end 25 of working piston 1. In the position of the parts illustrated in FIG. 1, a control bore or aperture 30 in the shell of pump rod 20 is just cleared by the control edge 31 of control sleeve 24, so that there is a connection between working zone 13 and storage tank 11 so that oil can flow out of working zone 13 into storage tank 11. The thus reduced carrying capacity of the shock absorber allows piston 1 to descend until control aperture 30 is closed by control sleeve 24, interrupting the discharge of oil from space 13. The end of control sleeve 24 extending into cavity 32 of working piston 1 is designed to have a length such that, at complete descent of the working piston to the position in which it is mechanically arrested, control aperture 30 remains covered by sleeve 24. A primer valve 29 is provided at the front wall 25 of working piston 1.

Cavity 32 of working piston 1 constitutes the pump cylinder of the shock absorber. A quantity of oil, determined by the emerging volume of pump rod 20, is drawn into cavity 32 by suction valve 23 from tank 11 and, upon reverse movement of pump rod 20, conveyed from cavity 32 into working zone 13 through outlet valve 29. Working piston 1 is sealed by packing 14 from working cylinder 3 and, by packing 15, relative to cover 5. To soften the compressive stress of packing 15, a small diameter aperture 16 is provided in piston 1 in order that the pressure in the clearance 17 between piston 1 and working cylinder 3 can adjust itself to a mean value between the pump inlet pressure and the pump outlet pressure.

In a shock absorber of FIG. 1, the pressure in storage tank 11 is, as a rule, lower than the pressure in the yielding gas cushion 9. In the shock absorber shown in FIG. 2, which will now be described, the pressure in storage tank 211 is, as a rule, greater than the pressure in gas cushion 209 which pressure loads working zone 213 through separating piston 210 and throttling bore or aperture 212. Pump rod 220 is secured to transverse wall 221 across which there extends a connection 218 communicating with storage tank 211. Control sleeve 224 has a collar 228 cooperating with the front end 225 of step piston 201 to form a suction valve. A pressure valve 223 is located in tubular pump rod 220.

Figure 2:
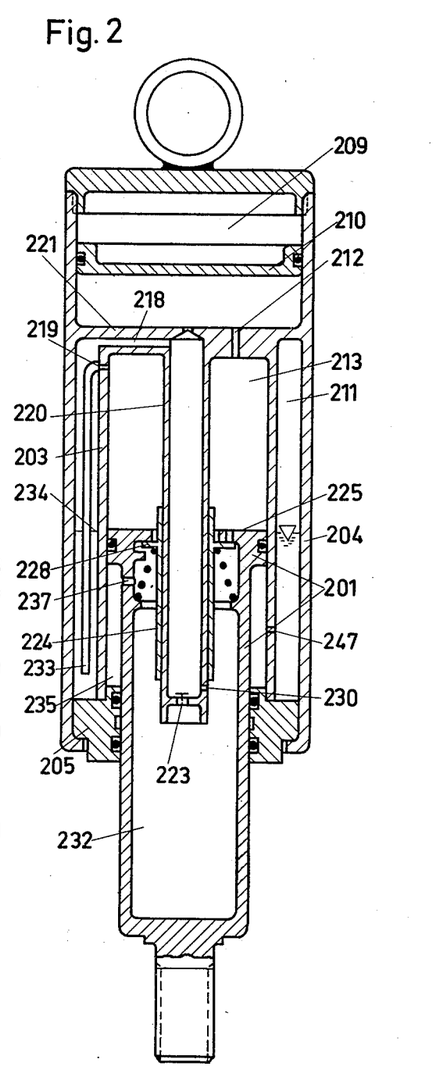
FIG. 2 is a longitudinal sectional view through another shock absorber embodying the invention and including a stepped working piston and a control sleeve serving as a suction valve.

In the retracted position of working piston 201, a control aperture 230 in pump rod 220 is cleared and, in the extended position of working piston 201, aperture 230 is covered or sealed by control sleeve 224. A very small diameter aperture 219 in the wall of working cylinder 203 permits, throughout the entire range of the stroke, oil to pass from storage tank 211 into working zone 213, so that piston 201 continually tries to extend from housing 204. In the extended position 201, the pump is in operation as long as control aperture 230 is covered by control sleeve 224, and reduces the carrying capacity of piston 201 by reduction of the pressure in working zone 213 due to delivery of oil into storage tank 211 until control aperture 230 is cleared, in the illustrated central position, and no further delivery of oil occurs. The quantity of oil pumped by the pump from working zone 213 into storage tank 211, in the extended position of piston 201, is greater than the quantity of oil flowing back through the calibrated bore 218 into working zone 213. From calibrated aperture 219, a connecting line 233 leads under the oil level 234 in storage tank 211.

The oil volume in annular zone 235 of stepped piston 201, which is variable in accordance with movements of the piston, is exchanged, through connection 237, with cavity 232 of piston 201. Upon extension of piston 201, oil passes from annular zone 235 into cavity 232. At the same time, pump rod 220 emerges to a greater extent from cavity 32 so that there appears, as active piston surface for pumping, the difference between the annular surface of zone 235 and the cross sectional area of pump rod 220. When the annular surface of zone 235 is large and the surface of the pump rod small, the pump rod acts essentially only as a line connecting annular zone 235 with storage tank 211 through outlet valve 223.

Figure 3:
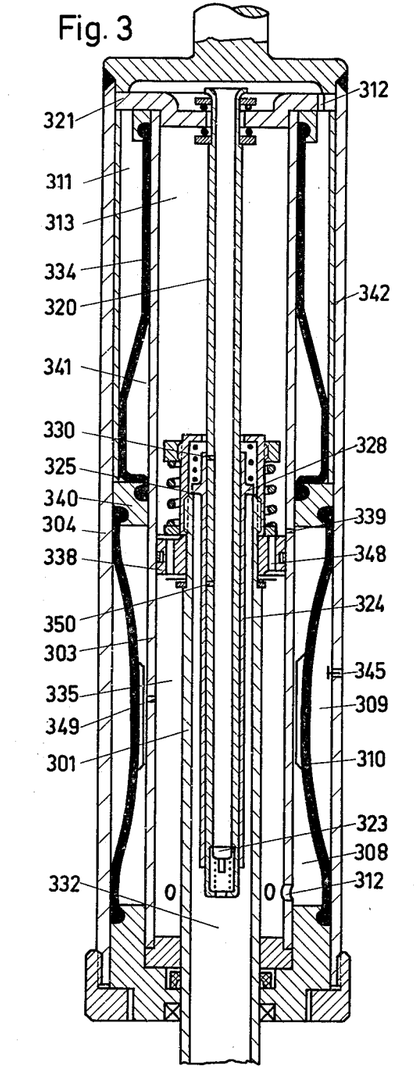
FIG. 3 is a longitudinal sectional view of a shock absorber embodying the invention and having working zones connected by passages in the working piston and with a control sleeve serving as an outlet valve.

In the embodiment of the shock absorber shown in FIG. 3, piston 338 at the end of hollow piston rod 301 is formed with passages 348 therethrough, and divides working cylinder 303 into working zones 313 and 335. The working zone 335 on the piston rod side of piston 338 communicates, through apertures or ports 312, with the oil of a compensation zone 308, this compensation zone being pressure loaded by gas cushion 309 acting against a membrane 310 in the nature of a movable partition. Additional, and preferably smaller diameter, ports or apertures 339 and 349 connect working zone 335 and compensation zone 308, in particular to prevent the formation of dead oil zones between cylinder 303 and membrane 310. Compensation zone 308 and gas cushion 309 are arranged in the annular zone between working cylinder 303 and outer tube or casing 304.

An annular partition 340 divides the aforementioned annular zone into two parts, one containing compensation zone 308 and gas cushion 309 and another which is subdivided by a flexible diaphragm or partition 334 into a reserve oil zone 311 and a gas cushion 341. In the initial state, and before a pumping effect has been initiated, the pressure of gas cushion 341 is preferably equal to the pressure of gas cushion 309 so that, in such initial state, the carrying force of the shock absorber is equal to the product of the pressure of the gas cushions 309, 341 and the difference between the effective pressures on the opposite end surfaces of piston 338, due to the differences in diameter between tubular piston rod 301 and tubular pump rod 320.

Rod 320 is secured, in an articulated manner, to a partition 321, and is closely embraced by control sleeve 324 whose collar 328, together with the end face 325 of piston rod 301, forms an outlet valve for pump zone 332. Upon extension of piston rod 301, pump zone 332 is filled through intake valve 323, the tubular pump rod 320 and aperture 312, from storage tank 311. Upon retraction of piston rod 301, pump zone 332 is evacuated into zone 313 through outlet valve 328. As long as control aperture 330 of pump rod 320 is closed with piston rod 301 retracted, the pump is fully operative. In the extended position of piston rod 301, control aperture 330 is uncovered by control sleeve 324 so that oil can escape from working zone 313 through aperture 330 into storage zone 311, and the known level regulation occurs. An additional aperture 350 may be provided to assist the drawing off of the oil.

Radial outward expansion of membrane 334 is limited by a spacer sleeve 342 which also absorbs the axial force of partition 340. Sleeve 342 is loosely guided in outer tube or casing 304.

Figure 4:
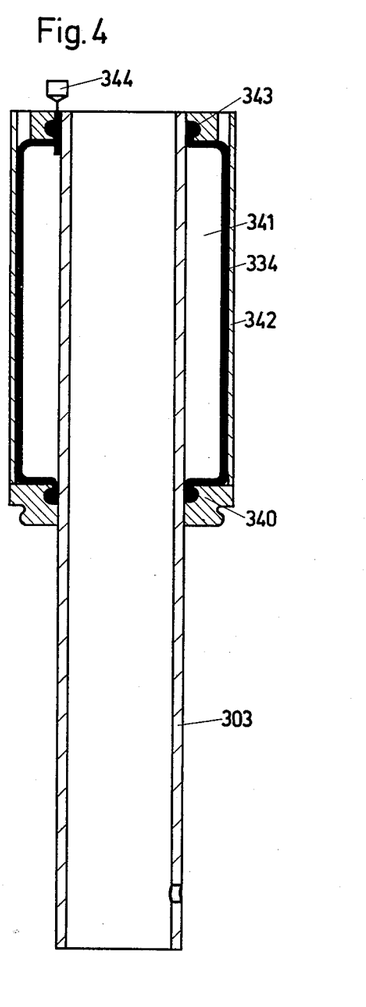
FIG. 4 is a longitudinal sectional view of a sub-assembly of the shock absorber of FIG. 3.

As best seen in FIG. 4, it is possible to fill zone 341 through a filling nipple 344, with gas of desired pressure and before assembly, the membrane being anchored by partition 340 and a ring 343, one at each end of the membrane. Due to this arrangement, membrane 334, together with similar tube 303, partition 340, ring 343 and sleeve 342 forms a sub-assembly which can be inserted into outer tube 304. As soon as the shock absorber is filled with oil and closed, upon assembly, gas cushion 309 is filled through an aperture 345 until the shock absorber has the desired operating pressure. At this time, piston rod 301 is in fully extended position so that the pressure transmitted by gas cushion 309 to the oil can propagate across aperture 330 into all parts of the shock absorber.

The invention is not limited to the embodiment shown in FIGS. 1 through 4. For example, the pump rod may be fastened to a transverse wall of the working system and the pump cylinder may be a part which is integral with the working cylinder. The open, or valve-fitted, connecting cross bores 12, 212, 237, 312, and 348, between the working and compensation zones, may be so dimensioned that, in addition to the pumping work representing damping work, desired damping work is produced by throttling. Under these circumstances, it is advantageous, by selection of adequate pump cross sections, to rate the pumping work essentially for damping of the vehicle super structure, the vibration velocity of which is, at most, about 0.6 m./s., and to rate the damping work by throttling so that it is low at this vibration velocity but becomes high at higher velocities which, for the axial vibration, may be 2 m./s. and more. This is possible, for example, in a simple manner with short open channels, whose velocity function is approximately quadratic. The pumping work becomes greater with increasing load in the desired manner.

Moreover, it is possible to influence the pumping work and thus the damping work by adequate proportioning and quantity of control apertures 30, 230, 330 and 530. A further control of the damping performance can be given by the position, number and size of the additional apertures 339 and 349 which, dependent on the stroke, establish, in the extended condition of piston rod 301, a connection between working zones 313 and 335, but not in the retracted position. Annular zone 235 of the step piston 201, used for pumping, may additionally have a small diameter aperture 247 in cylinder 203 for the control of the pump diaphragm, for venting, or for similar purposes.

Figures 5, 6, 7:
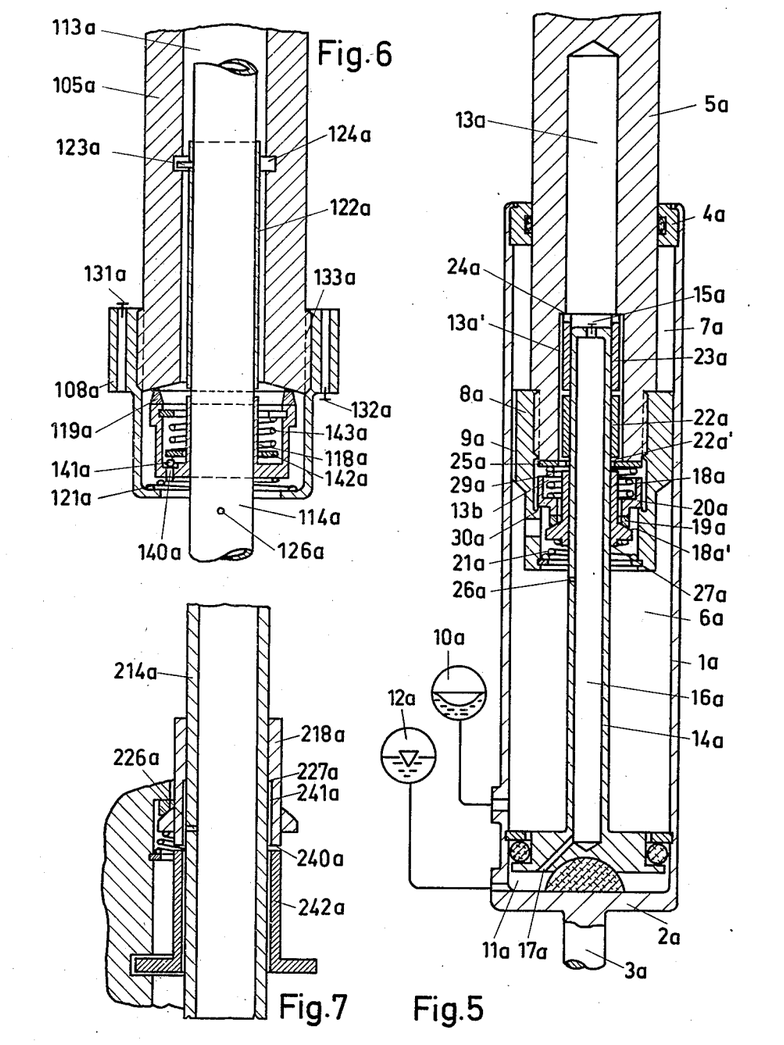
FIG. 5 is a longitudinal sectional view of another form of shock absorber embodying the invention with the control sleeve comprising axially spaced partial sleeves, the lower one of which acts as a valve.
FIG. 6 is a partial longitudinal sectional view of a detail of the working piston of a shock absorber such as shown in FIG. 5, but with the valve seat being designed as an overload valve.
FIG. 7 is a partial longitudinal sectional view of a working piston illustrating a modification of the piston shown in FIG. 6.

In the embodiment of the invention shown in FIGS. 5 through 7, the shock absorber cylinder 1a has a closed bottom end 2a carrying a pin 3a serving for anchoring the shock absorber to the axis of a vehicle. Piston rod 5a extends through cover 4a of working cylinder 1a. Working zones 6a and 7a of working cylinder 1a are connected, substantially without constriction, through slots 9a in working piston 8a, and are high pressure zones pressure loaded by the gas cushion 10a. Cavities in bottom wall 2a of the shock absorber form a low pressure zone 11a loaded by gas cushion 12a at atmospheric or superatmospheric pressures. Pump cylinder 13a comprises cavities of piston rod 5a and of piston 8a. Pump rod 14a, which is tightly connected in an articulated manner with bottom wall 2a, forms, with pump cylinder 13a, a displacement pump.

This pump draws from low pressure zone 11a through suction valve 15a and channel 16a and 17a of pump rod 14a, and delivers, through valve sleeve 18a, designed as a pressure valve, into high pressure zone 6a. Valve sleeve 18a is biased by spring 21a against slip ring 19a, in turn biasing the latter against valve seat 20a of piston 8a. Slip ring 19a serves as an intermediate member between valve seat 20a and the spherical surface 18a' of valve sleeve 18a, and can so adapt itself to the cardan movements of pump rod 14a that, in the suction stroke, valve sleeve 18a seals the pump relative to piston 8a.

The control sleeve, in this form of the invention, comprises a valve sleeve 18a and partial sleeves 22a, 23a associated therewith with axial spacing and projecting into pump cylinder 13a. The partial sleeves are fixed in their axial positions by shoulder 24a of pump cylinder 13a and disk 25a positioned between piston rod 5a and piston 8a. Partial sleeves 22a and 23a have play laterally with relation to pump cylinder part 13a' and permit, without hinderance, the flow of oil displaced by pump rod 14a from pump cylinder 13a into zone 13a' and zone 13b in the piston in advance of valve sleeve 18a.

A control aperture 26a in the outer shell or circumferential wall of pump rod 14a, and opening into cavity 16 of pump rod 14a, together with control edge 27a of valve sleeve 18a adjacent aperture 26a, determines the control point of the shock absorber. In the illustrated static position, the vehicle would stand somewhat above level and will descend until control ledge 27a covers control aperture 26a. Valve sleeve 18a and partial sleeves 22a and 23a embrace pump rod 14a with such a small clearance that little or no oil can flow through the control aperture when the latter is covered by valve sleeve 18a or partial sleeves 22a, 23a. The control aperture 26a is sealed so tightly that, in the static state, the vehicle will not descend for a prolonged time. Oil can flow only very slowly through clearance in the region of the circumference of the control aperture 26a. If, as shown, only one control aperture is provided, control sleeve 18a is biased by the pressure in high pressure zone 6a against the cylindrical wall of pump rod 14a, thereby providing additional sealing.

As soon as control aperture 26a becomes aligned with the region of the axial clearance 22a' between valve sleeve 18a and partial sleeves 22a, 23a, for evample upon load variation, a faster descent occurs since oil can flow freely through control aperture 26a after it is passed from high pressure zone 6a through the entire circumference of the gap between valve sleeve 19a and pump rod 14a. The axial spacing between control sleeve 18a and partial sleeve 22a is preferably vary small and, in this axial region, there occurs, to a slight degree, a sagging of the vehicle. If the axial region and the control aperture 26a are small, this sagging is either barely noticeable by the passenger or not noticeable at all.

The valve seat 20a of piston 8a for valve sleeve 18a may be fixedly connected with piston 8a or, as shown, it may be designed as an overload valve in that valve seat 20a is biased by an overpressure spring 29a against valve surface 30a of piston 8a. As soon as the maximum pressure determining the maximum carrying capacity of the shock absorber is exceeded, valve seat 20a is lifted off valve surface 30a during the suction stroke, and a connection is established between high pressure zone 6a and pump cylinder 13a so that the delivery of oil from low pressure 11a through suction valve 15a into high pressure zone 6a is interrupted.

In FIGURE 6, a piston 108a, provided with throttle valves 131a, 132a, is connected with piston rod 105a by a threaded connection 133a secured and sealed by adhesive, cavity 113a of the piston rod serving as a pump cylinder. Pump rod 114a, formed with a control aperture 126a, extends into pump cylinder 113a. Valve sleeve 118a and partial sleeve 122a function as a control sleeve, with partial sleeve 122a held against axial displacement by a pin 123a engaged in an annular groove 124a of piston rod 105a. Valve sleeve 118a, which functions in cooperation with slip ring 119a and valve spring 121a, receives, in its interior, the overload valve including preferably three valve balls 141a which are pressed by a common disk 142a and an overpressure spring 143a against overload apertures 140a.

In FIG. 7, pump rod 214a is closely embraced by a valve sleeve 218a whose control edge 227a determines, in cooperation with control aperture 226a, the adjusted level. Unlike the control edge 27a of FIG. 6 positioned at the end of valve sleeve 18a, the control edge 227a of valve sleeve 218a is formed within valve sleeve 218a. The region from control edge 227a to end 240a of valve sleeve 218a serves, through suitable means, for example through appropriate clearance 241a with relation to pump rod 214a, for retarding flow through control aperture 226a. This is for the purpose of retarding the adjusting of the shock absorber, and particularly adjusting of the shock absorber on the inner side of a curve during curve driving, when the latter is expanded in driving curves and strives to descend to its adjusted height in an undesirable manner. The effect can be reinforced or augmented by a separate partial sleeve 242a arranged outside the pump cylinder and whose position is evident from FIG. 7.

Figure 8:
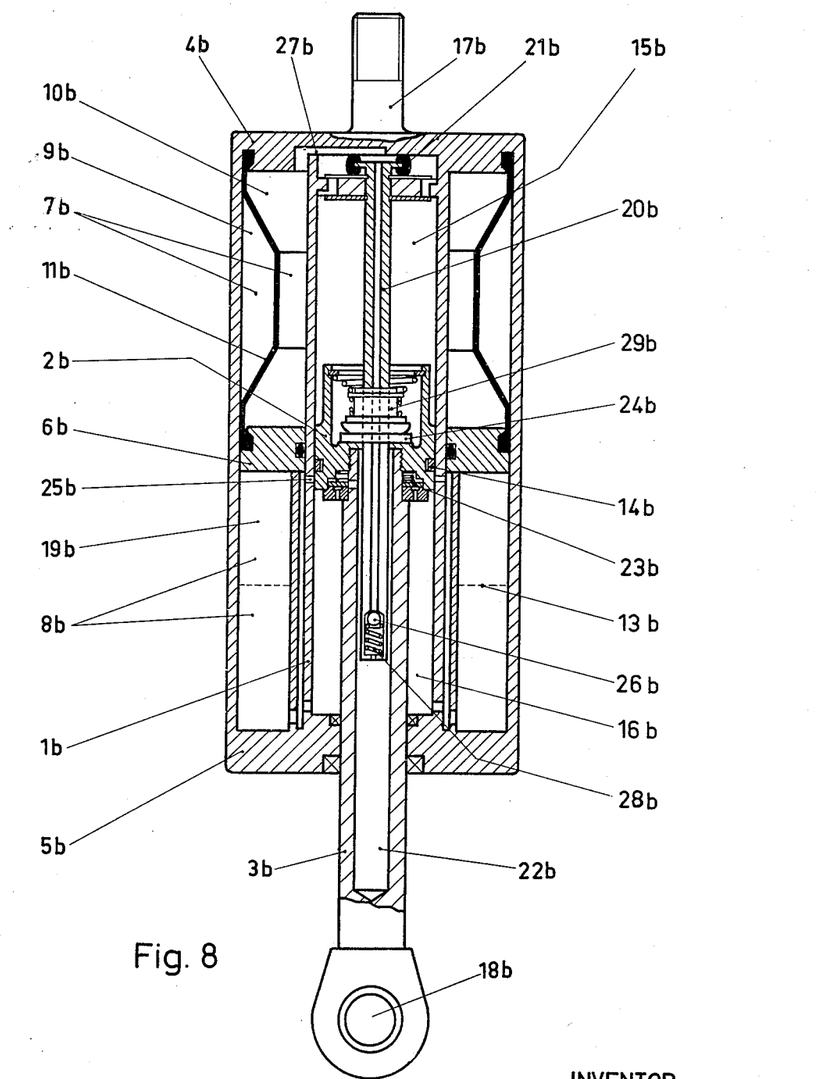
FIG. 8 is an axial or longitudinal sectional view of another form of shock absorber embodying the invention and wherein the control sleeve has, at its flange, valve-fitted openings for one direction of flow to prevent the sleeve friction interfering with valve actuation.

FIG. 8 illustrates an embodiment of the invention in which piston 2b at the end of a piston rod 3b slides in an oil-filled working cylinder 1b closed at one end by a bottom wall 4b and at the other end by a cover 5b through which piston rod 3b extends in sealing engagement. Bottom 4b is arranged to be anchored by pin 17b to the superstructure of the vehicle, and piston rod 3b is arranged to be anchored by an eye 18b to the axle of a vehicle in a manner which has not been illustrated.

Working cylinder 1b is surrounded by an anular compensation chamber filled partly with oil and partly with gas, and which is divided by a partition 6b into a high pressure chamber 7b and a low pressure chamber 8b. Gas cushion 9b of high pressure chamber 7b is separated from oil zone 10b by a membrane 11b. In low pressure chamber 8b, oil and gas are not separated from each other, and the oil level 13b is indicated in broken lines. In the adjusted, that is the non-pumped-up state, the same pressure prevails in low pressure chamber 8b as prevails in high pressure chamber 7b, and will be referred to as the starting pressure. The basic load, which is always supported by the shock absorber, is the extension pressure of the piston rod and corresponds to the piston rod surface and the starting pressure.

Piston 2b, which is sealed by an endless piston ring 14b, divides working cylinder 1b into two working zones. The inner working zone 15b, between working piston 2b and bottom 4b, communicates with high pressure chamber 7b, and the annular outer working zone 16b, between piston 2b and cover 5b, communicates with low pressure chamber 8b. In the pumped-up state, the pressure in high pressure chamber 7b is greater than that in low pressure chamber 8b. Also, the pressure in inner working zone 15b is greater than that in outer working zone 16b. Upon axial displacement of piston 2b, one or the other of the gas cushions 8b or 19b is compressed and the other is expanded. There thus result, in a double acting maner, dynamic forces operating to drive piston 2b back into the original position. In the inner working zone 15b these are positive forces whereas, in the outer working zone 16b, these are negative forces.

At the end wall 4b, pump rod 20b is secured by an elastic bearing 21b, and this rod, together with pump cylinder 22b formed by the hollow of piston rod 3b, forms an oil pump. The movements of the vehicle axle caused by uneveness of the road bed, and of the piston rod 3b attached thereto, actuate this pump which continuously delivers oil from low pressure chamber 8b into high presure chamber 7b as controlled by suction valve 23b and a pressure valve 24b. Thereby, high pressure gas cushion 9b is compressed and low pressure gas cushion 19b is expanded, the static carrying capacity of the device is increased and piston 2b is extended until control apertures 25b in working cylinder 1b are cleared by piston ring 14b and the regulating function sets in. Several control apertures are arranged around the periphery of working cylinder 1b to avoid piston 2b being pressed against a control aperture with the resultant production of undesired frictional forces.

If the pressure difference between high pressure chamber 7b and low pressure chamber 8b exceeds a predetermined amount when load is applied to the vehicle, overload valve 26b, which communicates with the oil of the high pressure side through hollow pump rod 20b and a channel 27b, opens counter to the force of a highly tensioned spring 28b. Now pump cylinder 22b is filled no longer exclusively through suction valve 23 but also through overload valve 26b, owing to which the pumping function gradually stops. The outlet of pump rod 20b from pump cylinder 22b is sealed by means of sleeve 29b closely surrounding the pump rod, and the details of which will be described in connection with FIG. 10.

Figure 9:
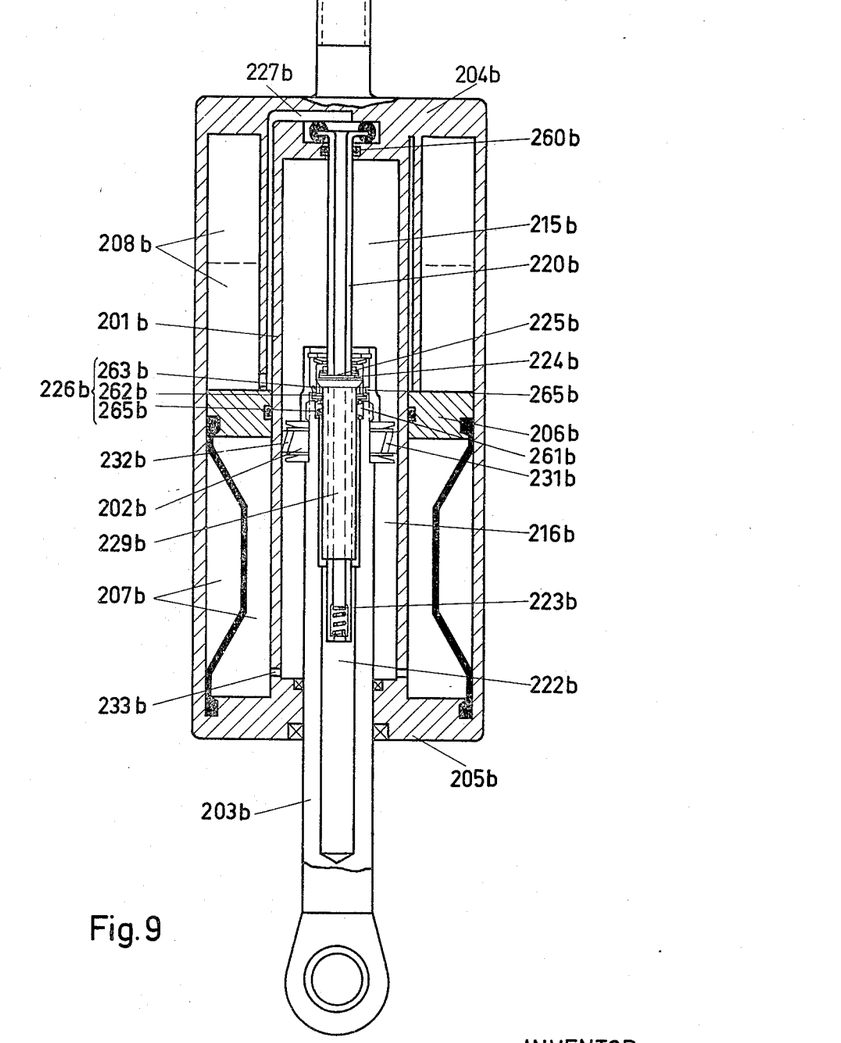
FIG. 9 is a view similar to FIG. 8, but with the control sleeve acting, in cooperation with an opening in the tubular pump rod, for level regulation.

The shock absorber shown in FIG. 9 includes an oil-filled working cylinder 201b in which there is slidable piston 202b mounted at the end of piston rod 203b and equipped with damping valves. Working cylinder 201b is closed at one end by an end wall 204b and, at the opposite end, by a cover 205b through which piston rod 203 extends in sealing relation. Working cylinder 201b is surrounded by an annular compenstation zone filled partly with oil and partly with gas, this zone being divided by a partition 206b into a high pressure chamber 207b, on the end toward cover 205b, and a low pressure chamber 208b, on the end toward wall 204b.

Piston 202b divides working cylinder 201b into inner working zone 215b and outer working zone 216b. These two working zones communicate through valve-fitted throttle apertures 231b, 232b of piston 202b, and through channel 233b with high pressure chamber 207b. Upon axial displacement of piston rod 203b, high pressure gas cushion 207b is compressed and produces a pressure force which tends to drive piston rod 203b back into the original position. Low pressure chamber 208b serves as a pure storage zone from which oil is delivered into the high pressure chamber.

Tubular pump 220b communicates with low pressure chamber 208b through channel 227b, and is secured to end wall 204b and sealed by a packing ring 260b relative to working cylinder 201b and low pressure chamber 208b. Pump rod 220b forms, together with the pump cylinder cavity or hollow 222b of piston rod 203b, an oil pump whose suction valve 223b is arranged at the free end of pump rod 220b with its pressure valve 224b being arranged in the region of control sleeve 229b. The regulating function commences when control aperture 225b is cleared by control sleeve 229b approximately in the middle of pump rod 220b during upward movement of piston rod 203b, and thus the high pressure side has an open communication with the low pressure side. Overload valve 226b arranged in piston cavity 261b exercises the same function as the overload valve 25b described in connection with FIG. 8. This overload valve comprises one or more valves 226b which normally close aperture 263b in piston partition 264b, with the closing pressure being produced by a helical spring 265b.

Figure 10:
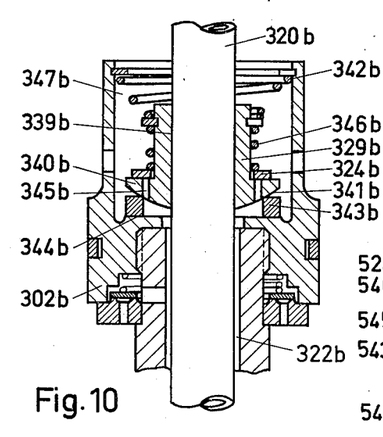
FIG. 10 is a partial axial sectional view illustrating the region of the control sleeve of FIG. 8 to a larger scale.

Referring to FIG. 10, sleeve 329b on pump rod 320b is sealed by means of a gland 339b. Sleeve 329b has a flange 340b connected in an articulated and tight manner with piston 302b so that a strong spring 342b presses the spherical end face 341b of flange 340b against a ball-socket-shaped ring 343b, and presses the latter against a plane end face 344b of piston 302b. The plane end face 344b and the spherical end face 341b form, with ring 343b, contact packing surfaces which permit a lateral and cardanic movement of sleeve 329b in order to compensate alignment faults between pump rod 320b and piston 302b.

Valve disk 324b is loaded by a relatively weak spring 346b and controls, in the manner of a check valve, control aperture 345b of flange 340b which, in the compression stroke, leaves the pump cylinders 322b connected with piston zone 347b and lets the delivered oil pass into the inner working zone 15b of FIG. 8. If the flow resistances of control apertures 345b or of valve disk 324b become too great, at high velocities of retraction of pump rod 320b into pump cylinder 322b, sleeve 329b can lift off ring 343b against the bias of spring 342b and/or ring 343b can lift off the end face 344b and allow additional oil to pass.

Figures 11, 13:
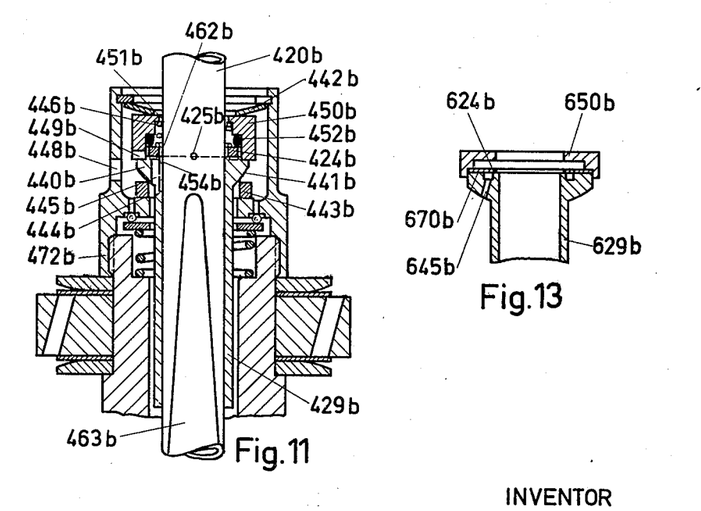
FIG. 11 is a view similar to FIG. 10, but illustrating the region of the control sleeve of FIG. 9 to a larger scale.
FIG. 13 is a partial longitudinal sectional view of a variant of the control sleeve shown in FIG. 11.

FIG. 11 illustrates, in the same detail as FIG. 10, a pump rod 420b, control sleeve 429b with flange 440b, spherical end face 441b and slide ring 443b, which rests on the end face 444b of piston 472b. Flange 440b is loaded by plate or disk spring 442b through an L-shaped ring 450b and pressed against ring 443b. Valve disk 442b, arranged inside L-ring 450b, covers apertures 445b in flange 440b and is pressed onto valve seat 454b by the relatively weak spring 446b. The stroke of valve disk 424b is limited by an abutment part preferably comprising a rubber elastic ring 452b which, at the same time, dampens the noises of valve disk 424b. The oil flowing through apertures 445b passes through slots 449b and channels 448b or, respectively, through annular gaps 451b, into working zone 215b of FIG. 9. Pump rod 420b has control aperture 425b which is covered or cleared by control edge 462b of bushing or control sleeve 429b, thus to control the level. Pump rod 420b has an inclined flat portion 463 which represents a slight leak and softens the pump shocks, in particular when the shock absorber is swinging through the level position.

Figure 12:
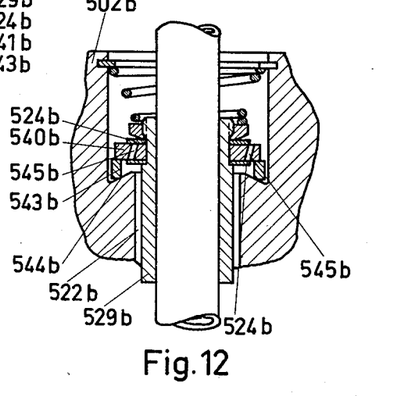
FIG. 12 is a partial axial sectional view illustrating a control sleeve similar to that shown in FIGS. 10 and 11, but fitted with valves for both directions of flow.

Referring to the embodiment of the invention shown in FIG. 12, control sleeve 529b has a special flange 540b which is equipped with double-acting plate valves. Spring plate 524b covers apertures 545b of flange 540b and faces toward pump cylinder 522b, and spring plate 524b covers apertures 545b and faces away from pump cylinder 522b. In addition, flange 540b can perform a valve function in cooperation with ring 543b and spherical valve seat 544b of piston 502b.

With the arrangement of FIG. 12, several valve combinations are possible. If, for example, valve plate 524b functions as a pressure valve of the pump, valve plate 524b can be used as the overload valve and flange 540b, together with ring 543b, as an additional safety valve. If valve plate 524b functions as a suction valve of the pump, it can be used as an overload valve evacuating pump cylinder 522b, and flange 540b, cooperating with ring 543b, can function as additional or as a sole overload valve, if valve plate 524b is not provided. Valve plate 524b is useable, for example, as the suction valve of the pump when, counter to the direction of delivery of FIGS. 8 and 9, oil is to be pumped from chambers, 7b, 207b into chambers 8b, 208b, as is the case in known shock absorbers whose base load corresponds to the maximum carrying capacity of the shock absorber at equality of pressure in both chambers.

In the embodiment of the invention shown in FIG. 13, sleeve 629b includes a plate valve 624b which is clamped between end face 670b, from which extend control apertures 645b of sleeve 629b, and ring 650b. Such a valve design has proven particularly advantageous with respect to satisfactory opening and closing movements and with respect to noiselessness.

What is claimed is:

1. In a hydropneumatic, self-pumping, telescopic shock absorber with level regulation, particularly for motor vehicles, of the type including means defining at least one oil-filled working zone, gas cushion means providing a loading pressure on the working zone, a pump cylinder, a working piston associated with the pump cylinder, and a tubular pump rod movable relative to the pump cylinder to pump oil from a zone at low pressure into the pump cylinder and to deliver oil into a zone at higher pressure, with the pump rod and the pump cylinder conjointly providing control edges cooperable with control apertures, in dependence on the stroke of the pump rod relative to the pump cylinder, to control connection of the working zones to each other and to the pump cylinder: the improvement comprising, in combination, control sleeve means, including a control sleeve closely embracing said pump rod and flexibly and tightly connected to said pump cylinder; said control sleeve having a free end extending from said pump cylinder and its opposite end extending into a cavity in said pump cylinder; said control sleeve acting conjointly with said pump rod to provide said control edges cooperable with said control apertures.

2. In a hydropneumatic, self-pumping, telescopic shock absorber with level regulation, particularly for motor vehicles, of the type including means defining at least one oil-filled working zone, gas cushion means providing a loading pressure on the working zone, a pump cylinder, a working piston associated with the pump cylinder, and a tubular pump rod movable relative to the pump cylinder to pump oil from a zone at low pressure into the pump cylinder and to deliver oil into a zone at higher pressure, with the pump rod and the pump cylinder conjointly providing control edges cooperable with control apertures, in depedence on the stroke of the pump rod relative to the pump cylinder, to control connection of the working zones to each other and to the pump cylinder: the improvement comprising, in combination, control sleeve means, including a control sleeve closely embracing said pump rod and mechanically connected to said pump cylinder; said control sleeve having a free end extending from said pump cylinder and its opposite end extending into a cavity in said pump cylinder; said control sleeve acting conjointly with said pump rod to provide said control edges cooperable with said control apertures; said control sleeve being formed with a radially outwardly extending collar; said pump cylinder being formed with a valve seat; said collar and said valve seat conjointly forming a check valve.

3. In a hydropneumatic, self-pumping, telescopic shock absorber with level regulation, particularly for motor vehicles, of the type including means defining at least one oil-filled working zone, gas cushion means providing a loading pressure on the working zone, a pump cylinder, a working piston associated with the pump cylinder, and a tubular pump rod movable relative to the pump cylinder to pump oil from a zone at low pressure into the pump cylinder and to deliver oil into a zone at higher pressure, with the pump rod and the pump cylinder conjointly providing control edges cooperable with control apertures, in dependence on the stroke of the pump rod relative to the pump cylinder, to control connection of the working zones to each other and to the pump cylinder: the improvement comprising, in combination, control sleeve means, including a control sleeve closely embracing said pump rod and mechanically connected to said pump cylinder; said control sleeve having a free end extending from said pump cylinder and its opposite end extending into a cavity in said pump cylinder; said control sleeve acting conjointly with said pump rod to provide said control edges cooperable with said control apertures; said telescopic shock absorber further including a working cylinder subdivided into two working zones interconnected by passages in the piston, and having compensation zones one of which receives an elastic gas cushion and communicates with a working zone and another compensation zone serving as a storage tank; and a piston rod connected to said piston; the compensation zone containing the elastic gas cushion communicating with the working zone at the piston rod surface of said piston.

4. In a hydropneumatic, self-pumping, telescopic shock absorber with level regulation, particularly for motor vehicles, of the type including means defining at least one oil-filled working zone, gas cushion means providing a loading pressure on the working zone, a pump cylinder, a working piston associated with the pump cylinder, and a tubular pump rod movable relative to the pump cylinder to pump oil from a zone at low pressure into the pump cylinder and to deliver oil into a zone at higher pressure, with the pump rod and the pump cylinder conjointly providing control edges cooperable with control apertures, in dependence on the stroke of the pump rod relative to the pump cylinder, to control connection of the working zones to each other and to the pump cylinder: the improvement comprising, in combination, control sleeve means, including a control sleeve closely embracing said pump rod and mechanically connected to said pump cylinder; said control sleeve having a free end extending from said pump cylinder and its opposite end extending into a cavity in said pump cylinder; said control sleeve acting conjointly with said pump rod to provide said control edges cooperable with said control apertures; said working piston being a stepped piston; a working cylinder operatively associated with said stepped piston and having an end closure; the annular zone defined by said stepped piston, said working cylinder and the closure for said working cylinder communicating substantially only with the interior of said pump cylinder.

5. In a hydropneumatic, self-pumping, telescopic shock absorber with level regulation, particularly for motor vehicles, of the type including means defining at least one oil-filled working zone, gas cushion means providing a loading pressure on the working zone, a pump cylinder, a working piston associated with the pump cylinder, and a tubular pump rod movable relative to the pump cylinder to pump oil from a zone at low pressure into the pump cylinder and to deliver oil into a zone at higher pressure, with the pump rod and the pump cylinder conjointly providing control edges cooperable with control apertures, in dependence on the stroke of the pump rod relative to the pump cylinder, to control connection of the working zones to each other and to the pump cylinder: the improvement comprising, in combination, control sleeve means, including a control sleeve closely embracing said pump rod and mechanically connected to said pump cylinder; said control sleeve having a free end extending from said pump cylinder and its opposite end extending into a cavity in said pump cylinder; said control sleeve acting conjointly with said pump rod to provide said control edges cooperable with said control apertures; said control sleeve means including said control sleeve and at least one second sleeve coaxial with said control sleeve and closely embracing said pump rod; one of said sleeves being designed as a check valve.

6. In a hydropneumatic, self-pumping, telescopic shock absorber, the improvement claimed in claim 5, in which the others of said sleeves are fixed against axial movement relative to said pump cylinder, providing for movement of said check valve.

7. In a hydropneumatic, self-pumping, telescopic shock absorber, the improvement claimed in claim 5, in which said pump cylinder has a valve seat cooperable with said one valve sleeve to form said check valve, said check valve constituting an overload valve.

8. In a hydropneumatic, self-pumping, telescopic shock absorber, the improvement claimed in claim 7, in which said one valve sleeve includes a first sleeve portion closely embracing said pump rod and a second sleeve portion spaced radially outwardly from said first sleeve portion, said sleeve portions being interconnected at one end of said one valve sleeve to define an annular interior space; said overload valve being located in said annular interior space.

9. In a hydropneumatic, self-pumping, telescopic shock absorber, the improvement claimed in claim 5, in which said one valve sleeve has a control edge cooperable with a control aperture in said pump rod; said control edge being formed as a shoulder on the radially inner surface of said one valve sleeve; and formations on said control sleeve means retarding flow through said control apertures.

10. In a hydropneumatic, self-pumping, telescopic shock absorber, the improvement claimed in claim 9, in which another of said sleeves is cooperable with said pump rod outside the pump cylinder and is formed to retard blocking of said control aperture.

11. A hydrophenumatic, self-pumping telescopic shock absorber with level regulation, particularly for motor vehicles, of the type including means defining at least one oil-filled working zone, gas cushion means providing a loading pressure on the working zone, a pump cylinder, a working piston associated with the pump cylinder, and a tubular pump rod movable relative to the pump cylinder to pump oil from a zone at low pressure into the pump cylinder and to deliver oil into a zone at higher pressure, with a pump rod and pump cylinder conjointly providing control edges cooperable with control apertures, in dependence on the stroke of the pump rod relative to the pump cylinder, to control connection of the working zones to each other and to the pump cylinder: the improvement comprising, in combination, control sleeve means, including a control sleeve closely embracing said pump rod and mechanically connected to said pump cylinder; said control sleeve having a free end extending from said pump cylinder and its opposite end extending into a cavity in said pump cylinder; said control sleeve acting conjointly with said pump rod to provide said control edges cooperable with said control apertures; said control sleeve being formed with a radially outwardly extending flange; a working cylinder defining an oil-filled working zone; said flange being formed with valve controlled apertures therethrough connecting said working cylinder with said pump cylinder.

12. In a hydropneumatic, self-pumping, telescopic shock absorber, the improvement claimed in claim 11, including valve disks controlling flow through the apertures through said flange; and spring means biasing said valve disks to aperture closing positions.

13. In a hydropneumatic, self-pumping, telescopic shock absorber, the improvement claimed in claim 11, including plate valves controlling flow through the apertures in said flange.

14. In a hydropneumatic, self-pumping, telescopic shock absorber, the improvement claimed in claim 11, in which said flange has an annular spherical surface; a ring having an annular surface formed to conform to said spherical surface, the opposite surface of said ring being planar; said piston having a planar end face engageable with the planar face of said ring; spring means biasing said flange into engagement with said ring and said ring into engagement with said end face of said piston; said flange being displaceable out of engagement with said ring and said ring being displaceable out of engagement with said end face, against the bias of said spring means, for passage of oil.

15. In a hydropneumatic, self-pumping, telescopic shock absorber, the improvement claimed in claim 11, including plate means controlling flow through the apertures in said flange; and a ring of resilient material in engagement with said plate means and limiting movement of the latter away from said flange.

16. In a hydropneumatic, self-pumping, telescopic shock absorber, the improvement claimed in claim 11, including a spring plate valve having one surface engageable with said flange to control the flow through the apertures in said flange; a ring engaged with the opposite surface of said spring plate valve; and spring means, having a stronger spring force than that of said spring plate valve, engageable with said ring and biasing said ring against said other surface of said spring plate valve to bias said spring plate valve into engagement with said flange.

References Cited

UNITED STATES PATENTS

| | | | |
|---|---|---|---|
| 2,436,573 | 2/1948 | Heynes | 267—64 |
| 2,879,057 | 3/1959 | Heiss | 267—64 |
| 3,194,547 | 7/1965 | Avner | 267—64 |

ARTHUR L. LA POINT, Primary Examiner